United States Patent

Chiang

Patent Number: 6,009,167
Date of Patent: Dec. 28, 1999

[54] DOUBLE-BELL RINGING SYSTEM OF A TELEPHONE

[76] Inventor: Jung-Hsun Chiang, Tu Cheng Town., Taipei Hsien, Taiwan

[21] Appl. No.: 08/965,294

[22] Filed: Nov. 6, 1997

[51] Int. Cl.$^6$ ............................................. H04M 1/00
[52] U.S. Cl. ................................. 379/428; 379/375
[58] Field of Search ....................... 379/428, 429, 379/435, 373, 374, 375

[56] References Cited

U.S. PATENT DOCUMENTS

| 534,547 | 2/1895 | Burchell | 379/428 |
| 3,293,373 | 12/1966 | Lohs | 379/428 |

Primary Examiner—Jack Chiang

[57] ABSTRACT

A double-bell ringing system of a telephone, including a base, a first bell and a second bell bilaterally supported on the base, a driving mechanism mounted on the base and controlled to reciprocate a reciprocating rod in striking the first bell and the second bell alternatively, the reciprocating rod having two plastic end pieces packed at its two opposite ends for beating the first bell and the second bell respectively, and a control bar mounted on the base and alternatively set between a first position where the control bar stops the reciprocating rod from striking the second bell, and a second position where the control bar is moved out of the path of the reciprocating rod for permitting the reciprocating rod to strike the first bell and the second bell alternatively.

3 Claims, 3 Drawing Sheets

DOUBLE-BELL RINGING SYSTEM OF A TELEPHONE

BACKGROUND OF THE INVENTION

The present invention relates to a double-bell ringing system for a telephone, and more particularly to such a double-bell ringing system which can be alternatively controlled to let one or both bells ring.

Regular double-bell ringing systems for a telephone are commonly complicated and occupy much installation space. Further, the manufacturing cost of these double-bell ringing systems is high.

SUMMARY OF THE INVENTION

According to the preferred embodiment of the present invention, the double double-bell ringing system comprises a base fixedly mounted inside a telephone, the base comprising a first upright bell support and a second upright bell support, a driving mechanism support disposed between the first upright bell support and the second upright bell support, and a recessed chamber around the second upright bell support; a first bell supported on the first bell support and fixedly secured thereto by a screw; a second bell supported on the second bell support and fixedly secured thereto by a screw; a driving mechanism controlled to strike the first bell and the second bell alternatively, the driving mechanism comprising a holder frame fastened to the driving mechanism support by screws, a reciprocating control mechanism mounted within the holder frame, and a reciprocating rod mounted in the reciprocating control mechanism and reciprocated to strike the first bell and the second bell alternatively; and a control bar mounted within the recessed chamber around the second upright bell support and alternatively set between a first position where the control bar stops the reciprocating rod from striking the second bell, and a second position where the control bar is moved out of the path of the reciprocating rod for permitting the reciprocating rod to strike the first bell and the second bell alternatively. The base is preferably injection-molded plastic to reduce its manufacturing cost.

BRIEF DESCRIPTION OF THE DRAWINGS

FIG. 4-1 is a sectional view showing the control bar set in the operative position according to the present invention; and FIG. 4-2 is a sectional view showing the control bar set in the non-operative position according to the present invention.

DETAILED DESCRIPTION OF THE PREFERRED EMBODIMENT

Figure 1:
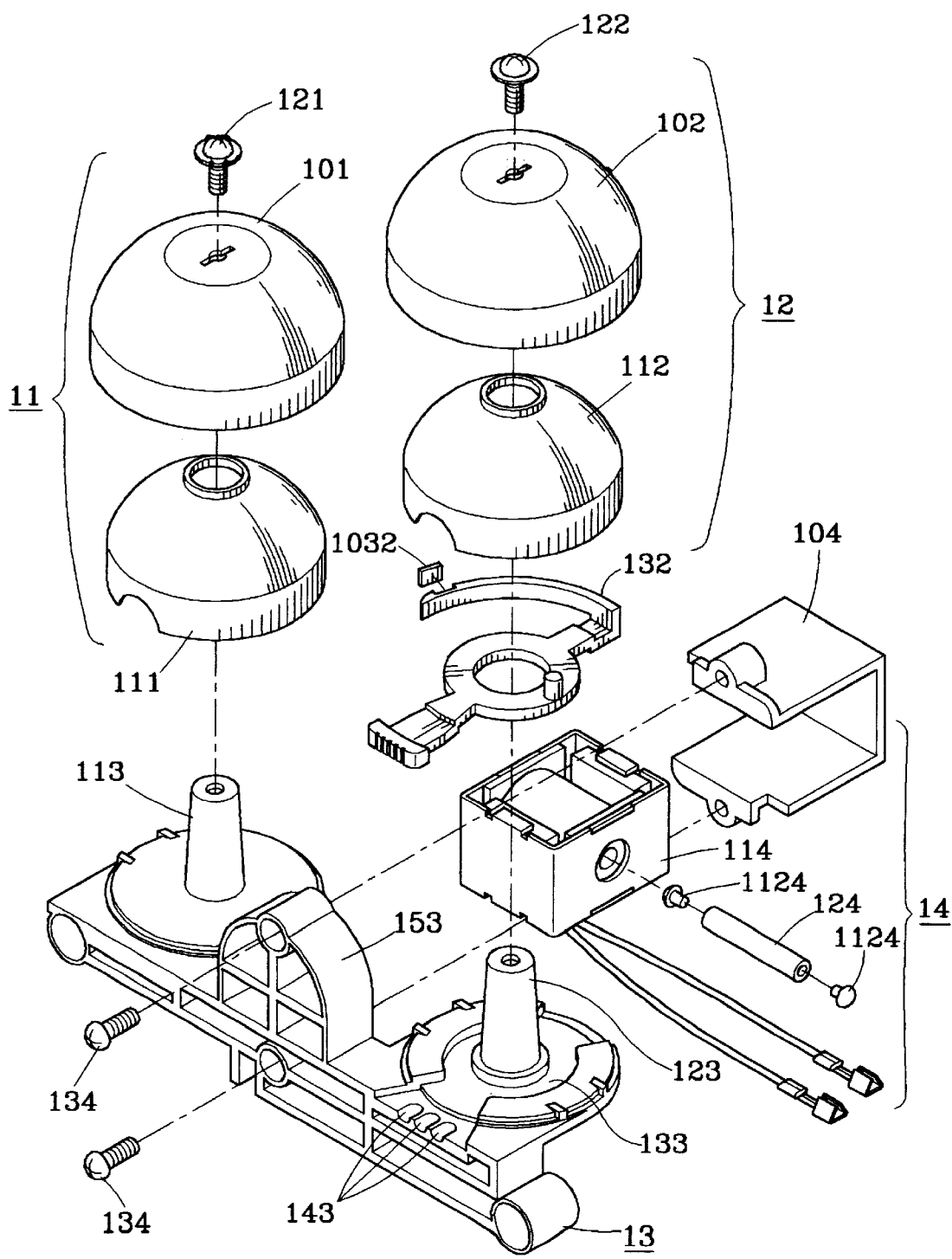
FIG. 1 is an exploded view of a double-bell ringing system according to the present invention.

Referring to FIG. 1, a double-bell ringing system in accordance with the present invention is generally comprised of a base 13 fixedly mounted inside a telephone, a first bell 11 and a second bell 12 bilaterally mounted on the base 13, and a driving mechanism 14 mounted on the base 13 between the bells 11;12 and controlled to sound the bells 11;12.

Figure 2:
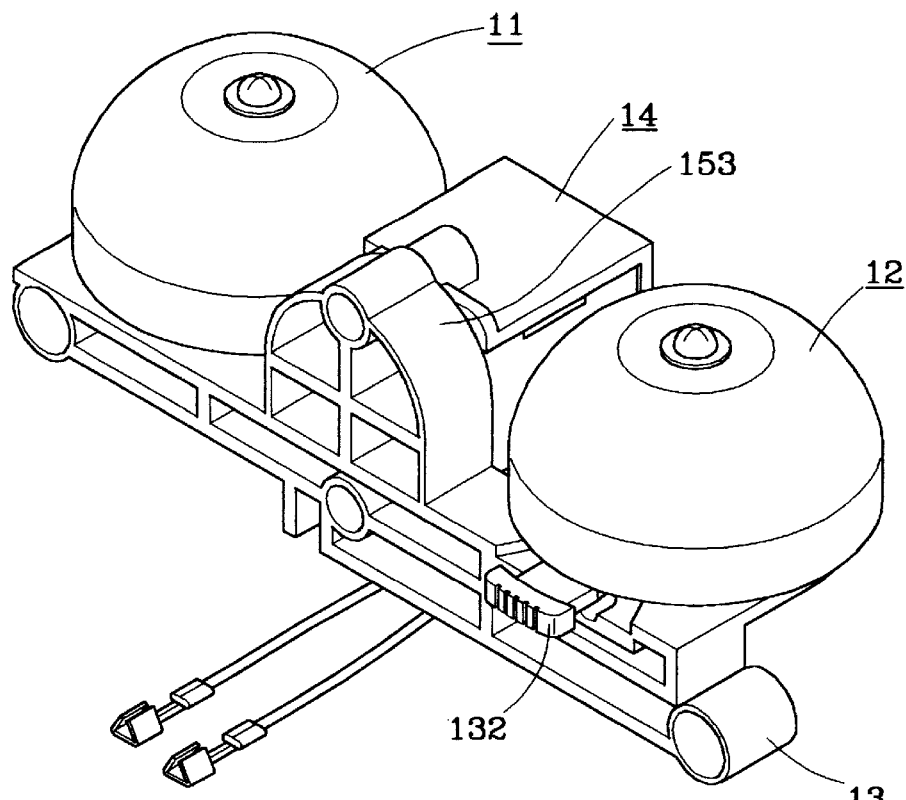
FIG. 2 is an elevational view of the present invention, showing the double-bell ringing system assembled.
Figure 3:
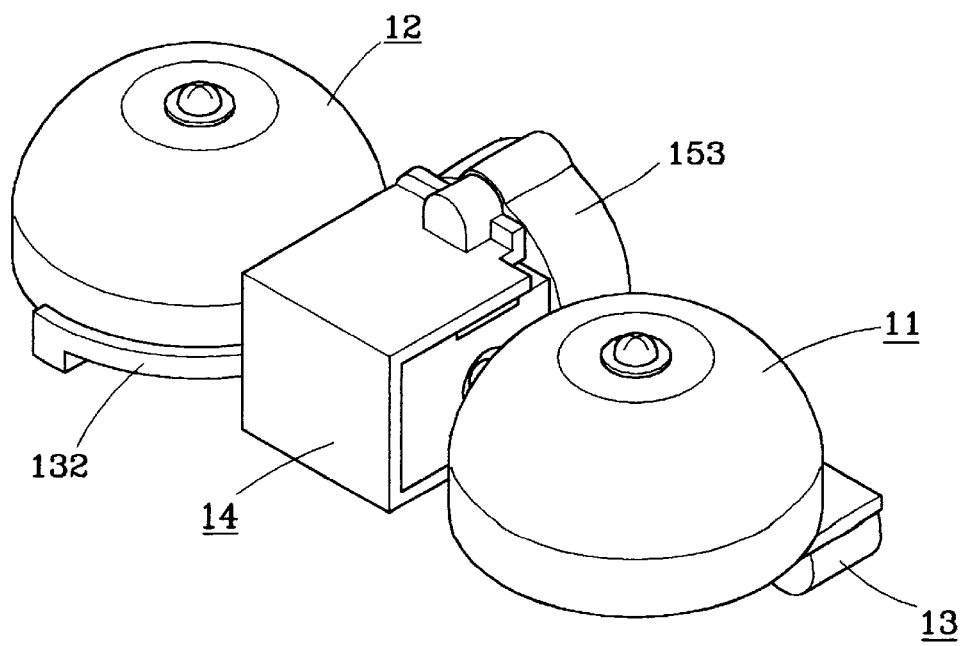
FIG. 3 is an elevational view of the present invention taken from another angle.

Referring to FIGS. 2 and 3 and FIG. 1 again, the base 13 comprises a first upright bell support 113 and a second upright bell support 123 near its both ends, a driving mechanism support 153 disposed in the middle between the upright bell supports 113;123, a recessed chamber 133 around the second upright bell support 113, and a plurality of locating grooves 143 disposed in front of the recessed chamber 133. The whole unit of the base 13 is made in integrity to reduce its manufacturing cost. For example, the base 13 can be integrally injection-molded from plastic. The first bell 11 is supported on the first bell support 113 and fixedly secured thereto by a screw 121. The first bell 11 is comprised of a bell body 101 and a plastic lining 111. The second bell 12 is supported on the second bell support 123 and fixedly secured thereto by a screw 122. The second bell 12 is comprised of a bell body 102 and a plastic lining 112. Further, a control bar 132 is mounted within the recessed chamber 133 around the second upright bell support 123 and secured to the locating grooves 143, having a cotton pad 1032 disposed outside the bell body 102 of the second bell 12. The driving mechanism 14 comprises a holder frame 104 fastened to the driving mechanism support 153 by screws 134, a reciprocating control mechanism 114 mounted within the holder frame 104, and a reciprocating rod 124 mounted in the reciprocating control mechanism 114 and reciprocated to strike the bell bodies 101;102 of the bells 11;12. The reciprocating rod 124 is a solid rod having two recessed holes 1024 at its two opposite ends, and two plastic end pieces 1124 respectively packed in the recessed holes 1024 and adapted for beating the bells 11;12.

Figures 1, 4:
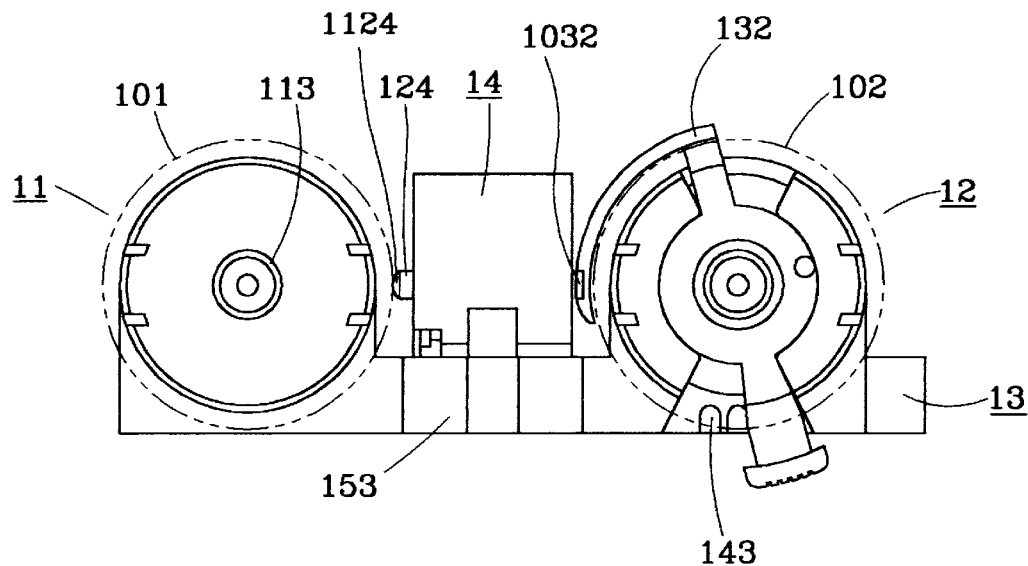
Figures 2, 4:
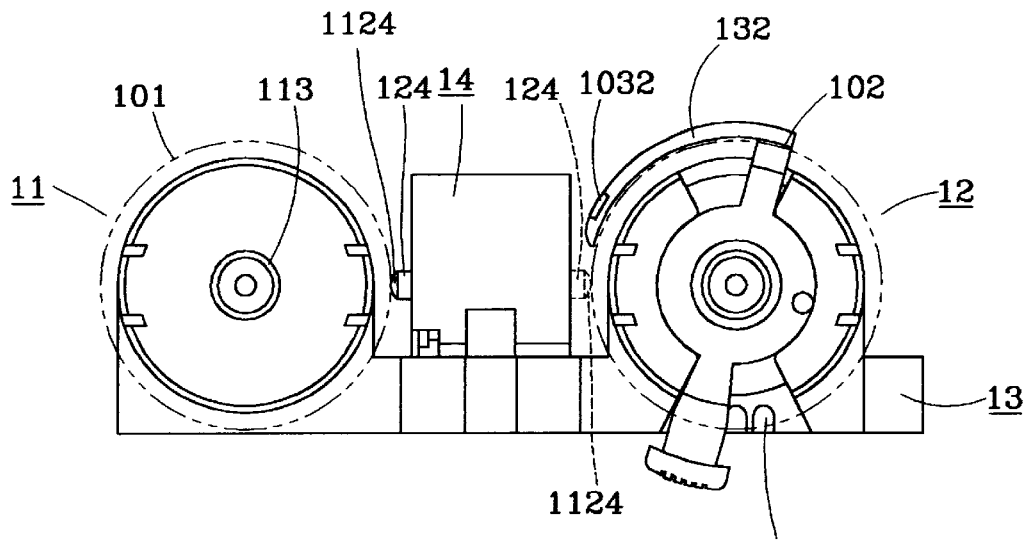

Referring to FIGS. 4-1 and 4-2, the control bar 132 can be adjusted between two positions, namely, the operative position where the cotton pad 1032 is disposed at one end of the reciprocating path of the reciprocating rod 124 to prohibit the reciprocating rod 124 from striking the bell body 102 of the second bell 12 (see FIG. 4-1), and the non-operative position where the cotton pad 1032 is moved with the control bar 132 out of the reciprocating path of the reciprocating rod 124 for permitting the reciprocating rod 124 to strike the first bell 11 and the second bell 12 alternatively (see FIG. 4-2). Because the reciprocating rod 124 has two plastic end pieces 1124 at its two opposite ends for beating the bells 11;12, pleasant sound is produced when the reciprocating rod 124 is reciprocated to alternatively beat the bells 11;12.

While only one embodiment of the present invention has been shown and described, it will be understood that various modifications and changes could be made thereunto without departing from the spirit and scope of the invention disclosed.

What the invention claimed is:

1. A double-bell ringing system of a telephone, comprising:

a base fixedly mounted inside a telephone, said base comprising a first upright bell support and a second upright bell support, a driving mechanism support disposed between said first upright bell support and said second upright bell support, and a recessed chamber around said second upright bell support;

a first bell supported on said first bell support and fixedly secured thereto by a screw;

a second bell supported on said second bell support and fixedly secured thereto by a screw;

a driving mechanism controlled to strike said first bell and said second bell alternatively, said driving mechanism comprising a holder frame fastened to said driving mechanism support by screws, a reciprocating control mechanism mounted within said holder frame, and a reciprocating rod mounted in said reciprocating control mechanism and reciprocated to strike said first bell and said second bell alternatively; and a control bar mounted within said recessed chamber around said second upright bell support and alternatively set between a first position where said control bar stops said reciprocating rod from striking said second bell, and a second position where said control bar is moved out of the path of said reciprocating rod for permitting said reciprocating rod to strike said first bell and said second bell alternatively.

2. The double-bell ringing system of claim 1, wherein said reciprocating rod has two recessed holes at two opposite ends thereof, and two plastic end pieces respectively packed in said recessed holes and adapted for beating said first bell and said second bell.

3. The double-bell ringing system of claim 1, wherein said control bar has a cotton pad mounted on one end thereof and disposed outside the bell body of said second bell.

* * * * *

UNITED STATES PATENT AND TRADEMARK OFFICE
CERTIFICATE OF CORRECTION

PATENT NO. : 6,009,167
DATED : Dec. 28, 1999
INVENTOR(S) : Jung-Hsun Chiang

It is certified that error appears in the above-identified patent and that said Letters Patent is hereby corrected as shown below:

Title page item [73] insert,

--Assignee: CHANG CHENG METALS ENTERPRISE CO., LTD.--

Signed and Sealed this

Thirtieth Day of January, 2001

Attest:

Q. TODD DICKINSON

*Attesting Officer*     *Director of Patents and Trademarks*